(12) United States Patent
Yamamuro (10) Patent No.: US 11,273,762 B2
(45) Date of Patent: Mar. 15, 2022

(54) VEHICLE CONTROL DEVICE

(71) Applicant: TOYOTA JIDOSHA KABUSHIKI KAISHA, Toyota (JP)

(72) Inventor: Akihiko Yamamuro, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 16/733,440

(22) Filed: Jan. 3, 2020

(65) Prior Publication Data

US 2020/0247318 A1 Aug. 6, 2020

(30) Foreign Application Priority Data

Feb. 4, 2019 (JP) .............................. JP2019-018264

(51) Int. Cl.
*B60R 21/01* (2006.01)
*B60Q 9/00* (2006.01)

(52) U.S. Cl.
CPC .................................... B60Q 9/008 (2013.01)

(58) Field of Classification Search
CPC ....................................................... B60Q 9/008
USPC .......................................................... 701/46
See application file for complete search history.

(56) References Cited

U.S. PATENT DOCUMENTS

| | | | |
|---|---|---|---|
| 8,384,534 B2 | 2/2013 | James et al. | |
| 9,786,178 B1 * | 10/2017 | Bai | B60Q 5/006 |
| 9,805,601 B1 * | 10/2017 | Fields | B60T 17/22 |
| 10,023,230 B2 * | 7/2018 | Sato | B60W 30/12 |
| 10,137,893 B2 | 11/2018 | Hanna | |
| 10,220,778 B2 * | 3/2019 | Tomioka | B60Q 9/008 |
| 10,235,882 B1 * | 3/2019 | Aoude | G06N 5/046 |
| 10,762,785 B1 * | 9/2020 | Dewey | G08G 1/04 |
| 2006/0208169 A1 * | 9/2006 | Breed | G06K 9/00624 250/221 |
| 2008/0068146 A1 * | 3/2008 | Cauldwell | G01R 33/02 340/435 |
| 2009/0299857 A1 * | 12/2009 | Brubaker | G06Q 30/0247 705/14.66 |
| 2012/0078498 A1 * | 3/2012 | Iwasaki | B60W 10/06 701/300 |
| 2012/0089321 A1 * | 4/2012 | Jung | A61B 3/113 701/301 |
| 2012/0320212 A1 * | 12/2012 | Aimura | B60R 1/00 348/148 |

(Continued)

FOREIGN PATENT DOCUMENTS

| | | |
|---|---|---|
| JP | 2004-246631 A | 9/2004 |
| JP | 2011-113275 A | 6/2011 |
| JP | 2013-235510 A | 11/2013 |

*Primary Examiner* — Kerri L McNally
*Assistant Examiner* — Thang D Tran
(74) *Attorney, Agent, or Firm* — Sughrue Mion, PLLC (57) ABSTRACT

A vehicle control device comprises a sensing section that senses a vehicle that is a candidate for alerting, and alert control section that, in a case in which the sensing section senses plural vehicles that are candidates for alerting, determines a recognition situation with respect to the plural candidates of alert sensed by the sensing section, by a recognition situation computing section and from a state of a driver that is detected by a state detecting section that detects a state of the driver, and carries out alert control with respect to a target of alert, which is a candidate having a highest priority among the plural candidates of alert for the determined recognition situation.

6 Claims, 10 Drawing Sheets

(56) References Cited

U.S. PATENT DOCUMENTS

| | | | |
|---|---|---|---|
| 2015/0148985 A1* | 5/2015 | Jo | G08G 1/163 |
| | | | 701/1 |
| 2015/0154461 A1* | 6/2015 | Kitaura | G06K 9/00604 |
| | | | 348/148 |
| 2015/0210274 A1* | 7/2015 | Clarke | G08G 1/167 |
| | | | 382/104 |
| 2015/0291033 A1* | 10/2015 | Restauri, III | B60K 35/00 |
| | | | 340/461 |
| 2016/0150070 A1* | 5/2016 | Goren | G06K 9/00805 |
| | | | 455/404.2 |
| 2016/0152182 A1* | 6/2016 | Aoki | B60W 30/0956 |
| | | | 340/435 |
| 2016/0335892 A1* | 11/2016 | Okada | G08G 1/123 |
| 2016/0375900 A1 | 12/2016 | Laur et al. | |
| 2017/0061222 A1* | 3/2017 | Hoye | G06K 9/00791 |
| 2017/0225617 A1* | 8/2017 | Morimura | G06K 9/00362 |
| 2017/0243485 A1* | 8/2017 | Rubin | H04W 4/026 |
| 2018/0005528 A1* | 1/2018 | Loeillet | G08G 1/165 |
| 2018/0086346 A1* | 3/2018 | Fujisawa | B62D 15/025 |
| 2018/0174465 A1 | 6/2018 | Ikedo et al. | |
| 2019/0039628 A1* | 2/2019 | Mizuno | B60W 50/14 |
| 2019/0126821 A1* | 5/2019 | Ho | G06F 3/013 |
| 2019/0179320 A1* | 6/2019 | Pacala | G01S 17/931 |
| 2020/0242922 A1* | 7/2020 | Dulberg | G08G 1/164 |

\* cited by examiner

VEHICLE CONTROL DEVICE

CROSS-REFERENCE TO RELATED APPLICATION

This application is based on and claims priority under 35 USC 119 from Japanese Patent Application No. 2019-018264 filed on Feb. 4, 2019, the disclosure of which is incorporated by reference herein.

BACKGROUND

Technical Field

The present disclosure relates to a vehicle control device that controls plural types of driving assist functions.

Related Art

Techniques are known of providing plural types of driving assist functions, which detect candidates for alerting and inform the driver, and reporting information to the driver.

For example, Japanese Patent Application Laid-Open (JP-A) No. 2004-246631 proposes, in a system that provides travel assisting information to a driver, dividing the travel assisting information into plural classes on the basis of the urgencies thereof, and providing information to the driver while prioritizing, within a same class, the event that is the subject of warning that has the shortest estimated time until the occurrence of the event.

However, although the technique of JP-A No. 2004-246631 takes into consideration the estimated time until the event that is the subject of warning occurs, the situation of the driver is not taken into consideration. Therefore, there is room for improvement in order to carry out driving assist, such as alerting the driver of the event that should be prioritized the most, and the like.

SUMMARY

The present disclosure provides a vehicle control device that can provide an appropriate alert for the situation of the driver, as compared with a case in which alerts are provided while giving a higher priority to a target of alert whose estimated time is shorter.

A vehicle control device of a first aspect comprises a sensing section that senses a candidate of alert, and a control section that, in a case in which the sensing section senses plural candidates of alert, determines a recognition situation with respect to the plural candidates of alert sensed by the sensing section, from a state of a driver that is detected by a state detecting section that detects a state of the driver, and carries out alert control with respect to a target of alert, which is a candidate having a highest priority among the plural candidates of alert for the determined recognition situation.

In accordance with the first aspect, a candidate of alert is sensed by the sensing section. For example, a vehicle that is approaching the driver's vehicle is sensed as a candidate of alert.

At the control section, in a case in which the sensing section senses plural candidates of alert, the recognition situation with respect to the plural candidates of alert sensed by the sensing section is determined from the state of the driver that is detected by the state detecting section that detects the state of the driver, and alert control with respect to the target of alert, which is a candidate having a highest priority among the plural candidates of alert is carried out for the determined recognition situation. Due thereto, an appropriate alert is possible for the situation of the driver, as compared with a case in which alert is given while giving higher priority to a target of alert that has a shorter estimated time.

Note that, as in a second aspect, the control section may determine the recognition situation from a sightline direction or a facing direction of the driver that serves as a state of the driver that is detected by the state detecting section, and may carry out alert control while prioritizing, among the plural candidates of alert, a target of alert that is farthest from the sightline direction of the driver. In this way, alert control is carried out while giving priority to the target of alert that is farthest from the sightline direction or the facing direction of the driver. Due thereto, alert can be given with respect to the target of alert that has a high possibility of not being recognized by the driver.

Further, as in a third aspect, the sensing section may respectively sense, as the plural candidates of alert, a first vehicle that is approaching the driver's vehicle from a lateral direction at an intersection, and a second vehicle that is approaching from a front side, and, in a case in which the first vehicle and the second vehicle are respectively sensed, the control section may carry out alert control while prioritizing, as a target of alert and among the first vehicle and the second vehicle, a vehicle that is further from the sightline direction of the driver. Due thereto, alert can be given while prioritizing, among the first vehicle and the second vehicle, the vehicle that has a higher possibility of not being recognized by the driver.

As in a fourth aspect, by using evaluation values, which are computed from directions of the plural candidates of alert that are sensed by the sensing section with respect to the sightline direction or the facing direction of the driver and times to collision with the plural candidates of alert that are sensed by the sensing section, the control section may specify a target of alert that is to be given priority in alerting, and carry out alert control with respect to the target of alert that has been specified. By carrying out alert control by using such evaluation values, appropriate alerting that reflects the situation of the driver is possible.

Further, as in a fifth aspect, by using a first evaluation value, which is determined from a direction of the first vehicle with respect to the sightline direction or the facing direction of the driver and a time to collision with the first vehicle, and a second evaluation value, which is determined from a direction of the second vehicle with respect to the sightline direction or the facing direction of the driver and a time to collision with the second vehicle, the control section may specify a vehicle that is to be given priority in alerting, and carry out alert control with respect to the vehicle that has been specified. Due thereto, by comparing the first evaluation value and the second evaluation value, the vehicle that is the candidate for alerting that should be prioritized can be specified.

Moreover, the sensing section may acquire information relating to the plural candidates of alert by wireless communication, and sense the plural candidates of alert by using acquired information. By acquiring information relating to the plural candidates of alert by wireless communication in this way, information of the plural candidates of alert such as vehicles and the like that exist at positions that the driver cannot see can be acquired, and the plural candidates of alert that exist at positions that the driver cannot see can be sensed.

As described above, in accordance with the present disclosure, there is the effect that a vehicle control device can be provided that can provide an appropriate alert for the situation of the driver, as compared with a case in which alert is given by giving higher priority to a target of alert whose estimated time is shorter.

BRIEF DESCRIPTION OF THE DRAWINGS

Exemplary embodiments of the present invention will be described in detail based on the following figures, wherein.

DETAILED DESCRIPTION

Figure 1:
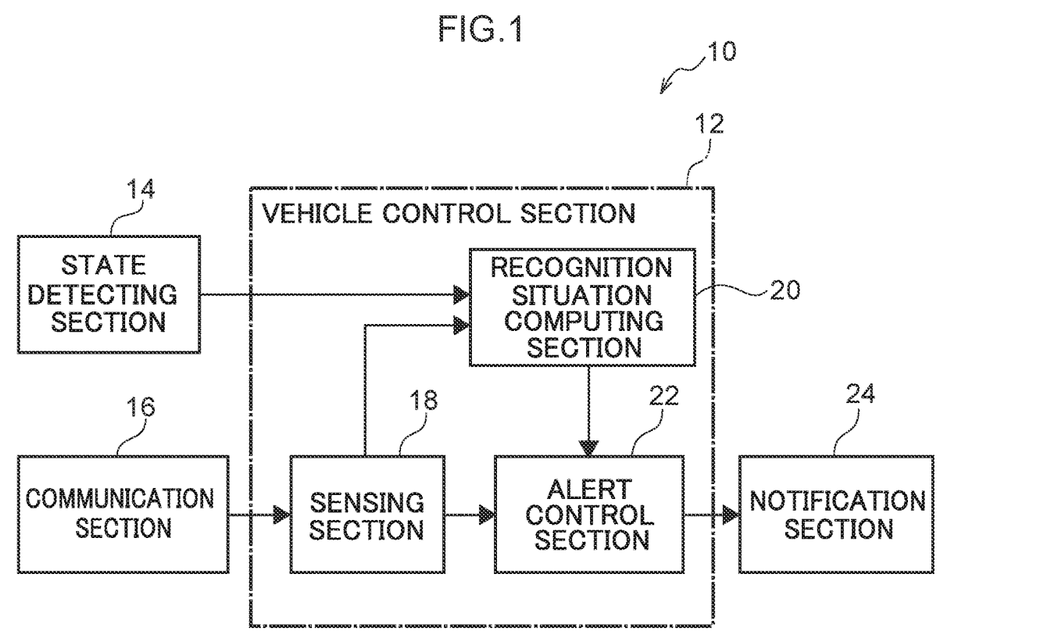
FIG. 1 is a block drawing showing the schematic structure of a vehicle control device relating to an embodiment of the present disclosure.

An example of an embodiment of the present disclosure is described in detail hereinafter with reference to the drawings. FIG. 1 is a block drawing showing the schematic structure of a vehicle control device relating to the present embodiment.

A vehicle control device 10 relating to the present embodiment has a vehicle control section 12 that has plural driving assist functions, which inform the driver of the existence of targets of alert, and that detects targets of alert and carries out alert control with respect to the driver. In the present embodiment, an example is described in which a vehicle that is a candidate for alerting is detected as a target of alert, and notification thereof is given to the driver. Note that examples of the plural driving assist functions include Emergency Electric Brake Light Warning, Lane Change Warning/Blind Spot Warning, Forward Collision Warning, Truck Forward Collision Warning, Intersection Movement Assist, Left Turn Assist and the like, but the driving assist functions are not limited to these. In the present embodiment, as an example, explanation is given of an example in which the vehicle control section 12 has two types of driving assist functions that are Intersection Movement Assist (abbreviated as IMA hereinafter) and Left Turn Assist (abbreviated as LTA hereinafter). Note that IMA is a driving assist function that issues alert with respect to a vehicle that is approaching from the lateral direction at an intersection. Further, LTA is a driving assist function that issues alert with respect to a vehicle that is approaching from the front side.

A state detecting section 14, a communication section 16 and a notification section 24 are connected to the vehicle control section 12. The vehicle control section 12 acquires various types of information from the state detecting section 14 and the communication section 16 respectively, and detects targets of alert, and controls the notification section 24 to alert the driver of the existence of targets of alert.

The state detecting section detects the state of the driver. Information for detecting the sightline of the driver, the awake state of the driver, or the like, is detected as the state of the driver that is to be detected. For example, a camera that captures images of the driver, a sensor that acquires biometric information of the driver, or the like can be used as the state detecting section 14. Hereinafter, explanation is given of an example in which captured images of the driver, which are for detecting the sightline direction or the facing direction of the driver, are acquired as an example of the state of the driver.

The communication section 16 carries out communication between vehicles, communication with communication systems' equipment that are provided on the road (so-called V2X (Vehicle to Everything)), communication with servers such as cloud servers and the like, and the like. For example, inter-vehicle communication (V2V: Vehicle-to-Vehicle), road-vehicle communication (V2I: Vehicle-to-Infrastructure), communication between the driver's vehicle and pedestrians (V2P: Vehicle-to-Person), communication between the driver's vehicle and a residence (V2H: Vehicle-to-Home), and the like are examples of communications that the communication section 16 carries out. Communications are carried out by using, for example, a communication standard called DSRC (Dedicated Short Range Communication). Information relating to vehicles at the periphery of the driver's vehicle can be acquired by the communication section 16 carrying out wireless communication.

At the time when a target of alert is sensed and alert is to be given to the driver by the vehicle control section 12, the notification section 24 gives the alert by display of or by voice output of information relating to the target of alert. The notification section 24 can utilize various types of HMIs (Human Machine Interfaces), and can use monitors and speakers or the like for example.

The vehicle control section 12 has a sensing section 18, a recognition situation computing section 20, and alert control section 22 as the functions thereof. Note that the recognition situation computing section 20 and the alert control section 22 correspond to the control section.

The sensing section 18 senses, as a target of alert, a vehicle that is a candidate for alerting that is at the periphery of the vehicle. Concretely, due to the communicating section 16 communicating with peripheral vehicles, roadside equipment, servers and the like, the sensing section 18 acquires various types of information relating to vehicles that are at the periphery of the driver's vehicle and that may become candidates for alerting. For example, position information, and information such as vehicle speed information, height information and the like of vehicles that are at the periphery of the driver's vehicle are acquired via the communication section 16. Further, the sensing section 18 also acquires position information and various types of information such as vehicle speed information and the like of the driver's vehicle. Then, on the basis of the acquired information of the driver's vehicle and vehicles at the periphery of the driver's vehicle, the sensing section 18 senses vehicles that are candidates for alerting. For example, on the basis of the driver's vehicle position information, position information of vehicles at the periphery of the driver's vehicle, vehicle speed information of the both, and the like, the sensing section 18 senses vehicles that are approaching the driver's vehicle, computes the estimated times until collisions therewith (TTC: Time To Collision), and senses vehicles that are candidates for LTA and IMA alerting. Here, due to the communication section 16 acquiring information by wireless communication, the communication section 16 can acquire information relating to vehicles that exist at positions that the driver cannot see from the driver's vehicle, and can sense vehicles and the like that are candidates for alerting that exist at positions that the driver cannot see. Note that, hereinafter, the estimated time until a collision is abbreviated as TTC.

From the state of the driver that is detected by the state detecting section 14, the recognition situation computing section 20 determines the recognition situation of the driver with respect to targets of alert, and outputs the determined recognition situation to the alert control section 22. For example, from the sightline direction of the driver that is detected by the state detecting section 14, and the direction of a vehicle that is a candidate for alerting that is sensed by the sensing section 18, the recognition situation computing section 20 computes a value, which expresses the recognition situation of the driver with respect to the vehicle that is a candidate for alerting, and outputs the results of computation to the alert control section 22.

In a case in which a vehicle that is a candidate for alerting is sensed by the sensing section 18, the alert control section 22 controls the notification section 24 and effects control so as to provide notice of the existence of the vehicle that is the candidate for alerting.

Here, in a case in which plural vehicles that are candidates for alerting are sensed by the sensing section 18, the alert control section 22 carries out alert control with respect to the vehicle that is the candidate for alerting that has a high degree of priority, for the recognition situation of the driver that is determined by the recognition situation computing section 20. Concretely, on the basis of the value expressing the driver's situation of recognizing the vehicles that are the candidates for alerting which value is computed by the recognition situation computing section 20, the alert control section 22 specifies a vehicle that is the candidate for alerting, and, by the notification section 24, issues alert about the vehicle that is the candidate for alerting that has been specified.

Figure 2:
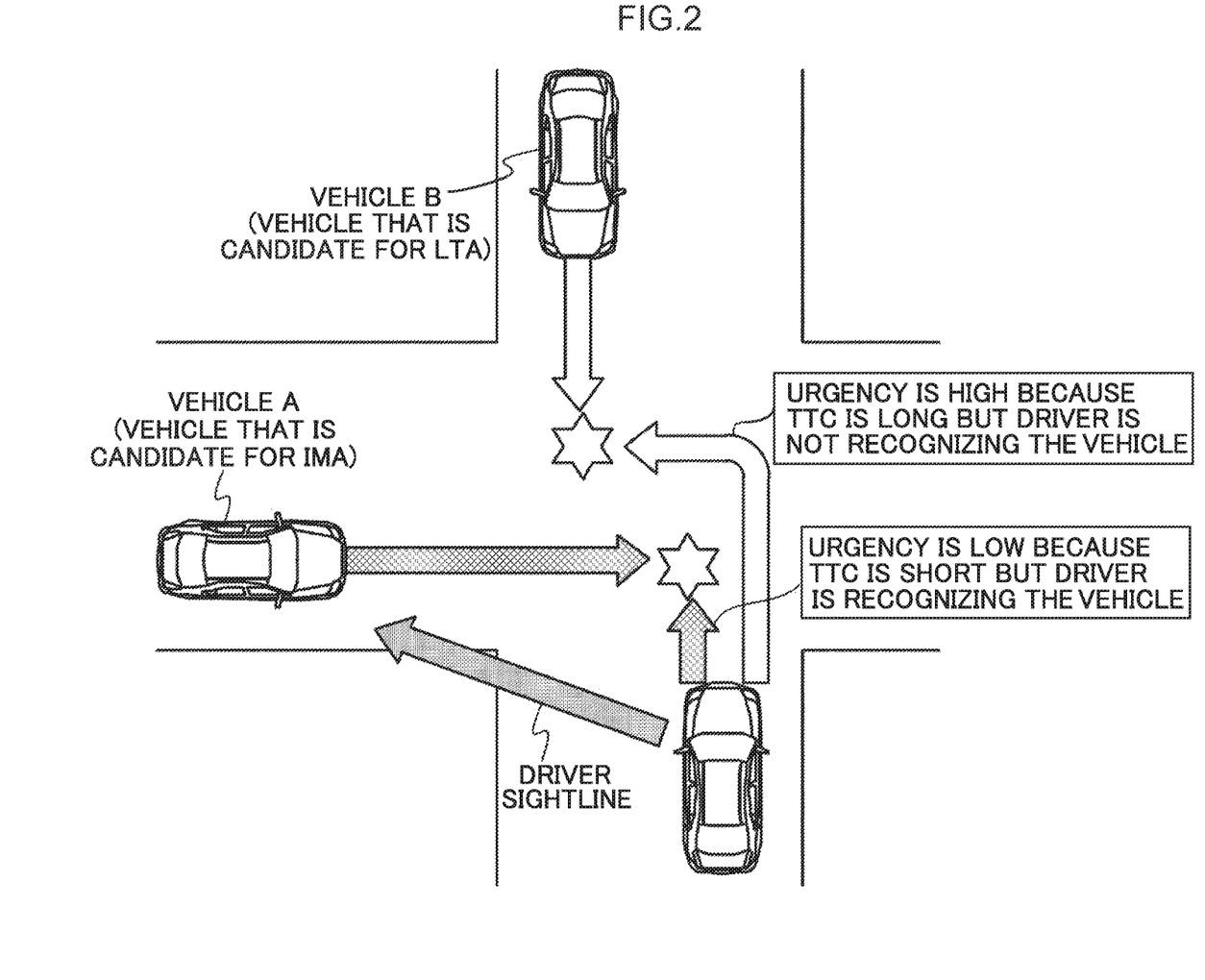
FIG. 2 is a drawing showing the situation of an example of a case in which a vehicle that is a candidate for IMA and a vehicle that is a candidate for LTA exist, and the driver is looking in the direction of the vehicle that is the candidate for IMA.

In conventional techniques, in a case in which plural vehicles that are candidates for alerting are sensed, the degrees of priority of the vehicles that are the candidates for alerting are specified by using the TTCs. However, the TTC value being low does not necessarily in and of itself express urgency. For example, in a case in which the driving assist functions of IMA and LTA are used as examples, as shown in FIG. 2, vehicle A that is a candidate for IMA and vehicle B that is a candidate for LTA are sensed by the sensing section 18. In a case in which the TTC value of vehicle B is greater than that of vehicle A, although the TTC value of vehicle B that is the candidate for LTA is large, vehicle B has a high urgency because the driver is not recognizing vehicle B. On the other hand, there are cases in which, although the TTC value of vehicle A that is the candidate for IMA is small, vehicle A has low urgency because the driver is recognizing vehicle A.

Figure 3:
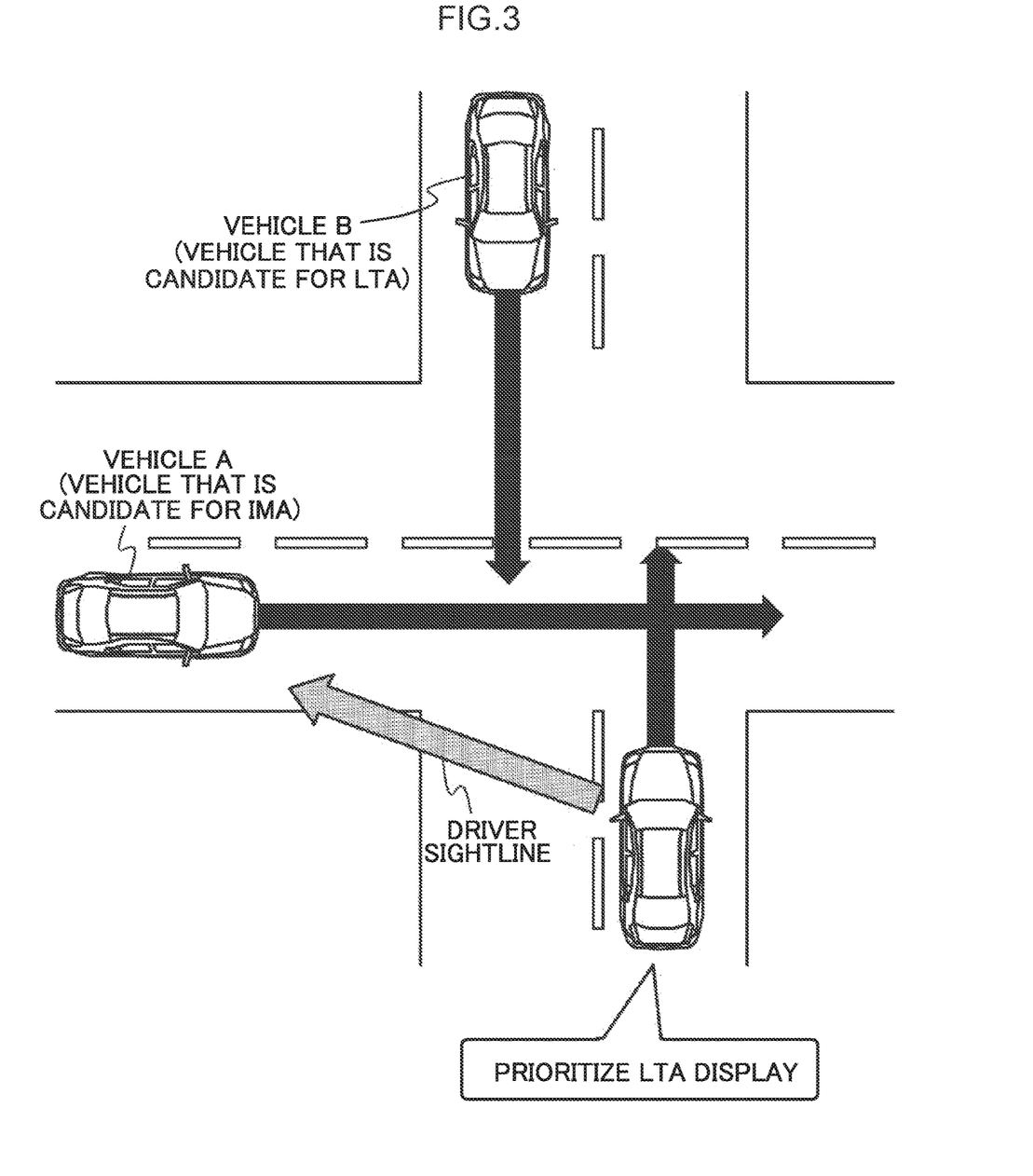
FIG. 3 is a drawing showing a case in which a vehicle that is a candidate for IMA and a vehicle that is a candidate for LTA exist, and the sightline of the driver is in the direction of vehicle A that is the candidate for IMA.
Figure 4:
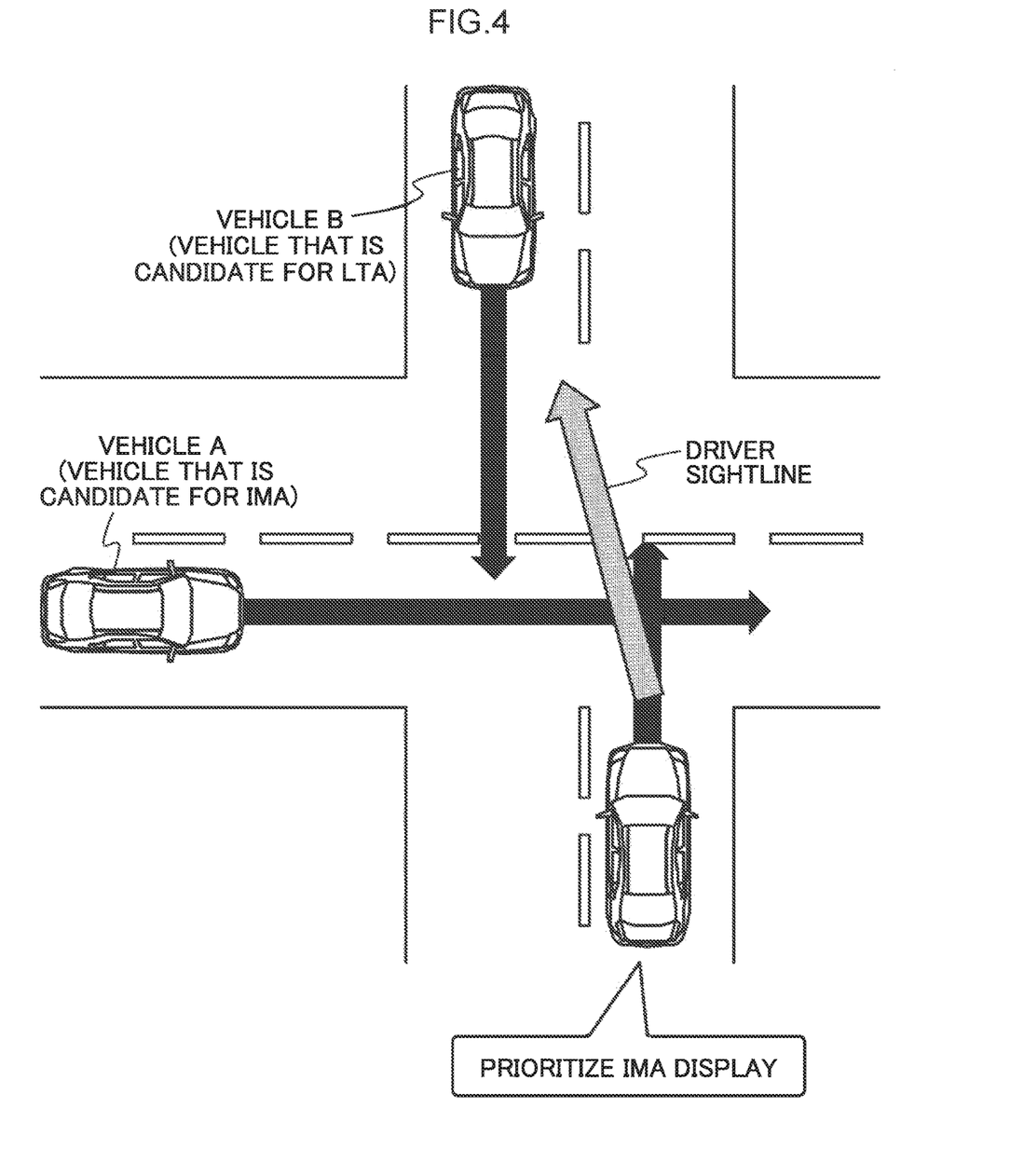
FIG. 4 is a drawing showing a case in which a vehicle that is a candidate for IMA and a vehicle that is a candidate for LTA exist, and the sightline of the driver is in the direction of vehicle B that is the candidate for LTA.

Thus, in the present embodiment, on the basis of the results of computation of the recognition situation computing section 20, the alert control section 22 specifies the degrees of urgency of the vehicles that are candidates for alerting, and carries out control that carries out alerting. Concretely, in a case in which, from the results of computation of the recognition situation computing section 20, the sightline direction or the facing direction of the driver is the direction of vehicle A that is the candidate for IMA as shown in FIG. 3, the alert control section 22 carries out control such that alerting is carried out while prioritizing vehicle B that is the candidate for LTA. On the other hand, in a case in which the sightline direction or the facing direction of the driver is the direction of vehicle B that is the candidate for LTA as shown in FIG. 4, the alert control section 22 carries out control such that is alerting is carried out while prioritizing vehicle A that is the candidate for IMA. Due thereto, alert can be given with respect to the vehicle that is a candidate for alerting and that has a high possibility of not being recognized by the driver. Accordingly, as compared with a case in which alerting is carried out by giving a higher priority to the vehicle that is a candidate for alerting whose TTC is shorter, it is possible to specify a target of alert and to issue alert while taking the actual urgency into consideration.

Figure 5:
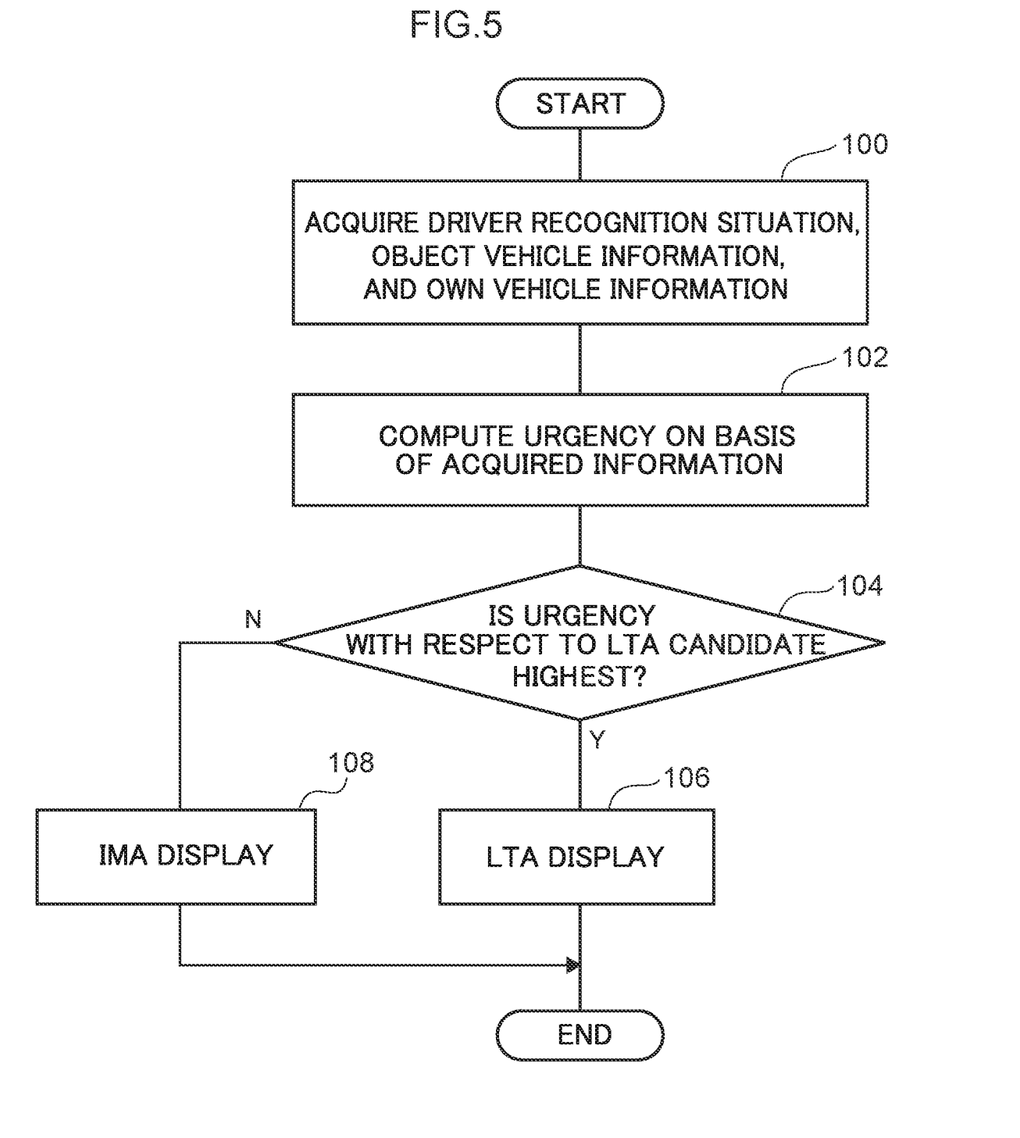
FIG. 5 is a flowchart showing an example of the flow of processings that are carried out at a vehicle control section of the vehicle control device relating to the present embodiment.

Processing that is carried out by the vehicle control section 12 of the vehicle control device 10, which relates to the present embodiment and is configured as described above, is described next. FIG. 5 is a flowchart showing an example of the flow of processings that are carried out at the vehicle control section 12 of the vehicle control device 10 relating to the present embodiment. Note that the processings of FIG. 5 start in a case in which plural vehicles that are candidates for alerting (vehicles that are candidates for LTA and IMA alertings respectively) are sensed by the sensing section 18.

In step 100, the alert control section 22 acquires the driver recognition situation, object vehicle information and the driver's vehicle information, and then moves on to step 102. Namely, the alert control section 22 acquires the results of computing of the recognition situation computing section 20 as the driver recognition situation, and acquires object vehicle information and the driver's vehicle information.

In step 102, the alert control section 22 computes urgencies on the basis of the acquired information, and moves on to step 104. The computing of the urgency is, for example, the computing of a value expressing the degree of correspondence of the direction of the sightline of the driver and the direction of the object vehicle.

In step 104, the alert control section 22 judges whether or not the urgency with respect to the vehicle that is the candidate for LTA is highest. If this judgment is affirmative, the alert control section 22 moves on to step 106. If the urgency with respect to the vehicle that is the candidate for IMA is highest and the judgment is negative, the alert control section 22 moves on to step 108.

In step 106, the alert control section 22 controls the notification section 24 and carries out LTA display, and ends the series of processings. Note that, in LTA display, the notification section 24 is controlled and alert is given with the vehicle that is the candidate for LTA being the vehicle that is the candidate for alerting.

On the other hand, in step 108, the alert control section 22 controls the notification section 24 and carries out IMA display, and ends the series of processings. Note that, in IMA display, the notification section 24 is controlled and alert is given with the vehicle that is the candidate for IMA being the vehicle that is the candidate for alerting.

In this way, in the present embodiment, in a case in which plural vehicles that are candidates for alerting are sensed, the vehicle that is the candidate for alerting for which alert is to be given is specified while prioritizing the vehicles by taking the state of the driver into consideration, and alert is issued. Therefore, an appropriate alert can be given for the situation of the driver.

Figure 6:
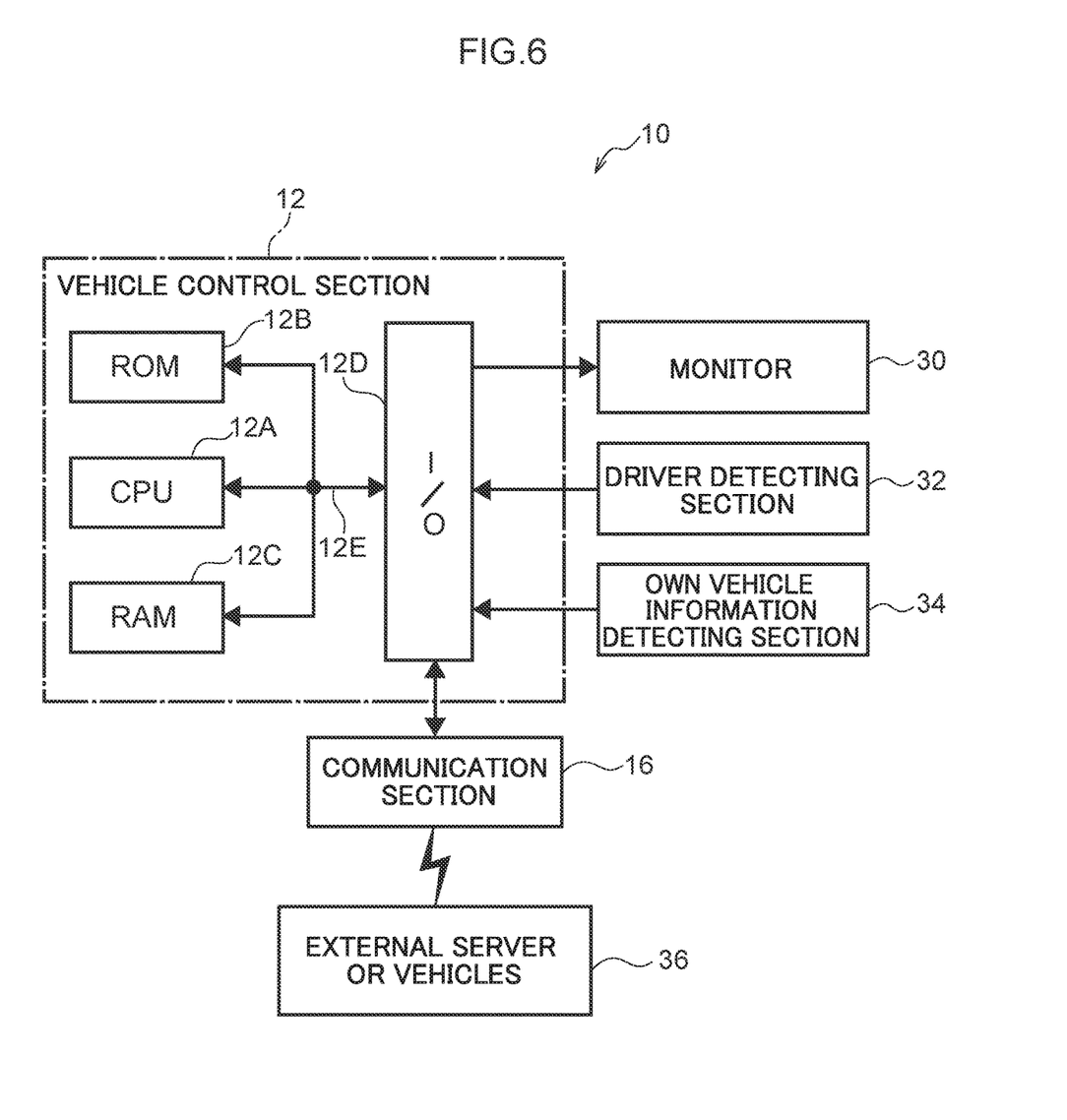
FIG. 6 is a block drawing showing the concrete structures of the vehicle control device relating to the present embodiment.

Here, the vehicle control device 10 relating to the above-described embodiment will be described more concretely. FIG. 6 is a block drawing showing concrete structures of the vehicle control device 10 relating to the present embodiment. Note that structures that are similar to those in FIG. 1 are described by being denoted by the same reference numerals.

The above-described vehicle control section 12 can concretely be configured by a computer in which a CPU 12A, a ROM 12B, a RAM 12C and an I/O (input/output interface) 12D are connected to a bus 12E.

Programs for executing driving assist functions that notify the driver of the existence of targets of alert, and the like, are stored in the ROM 12B. Control that notifies the driver of the existence of a target of alert is carried out due to a program, which is stored in the ROM 12B that serves as a memory, being expanded in the RAM 12C, and the CPU 12A that serves as a processor executing the program.

A monitor 30 that corresponds to the above-described notification section 24, a driver detecting section 32 that corresponds to the state detecting section 14, the driver's vehicle information detecting section 34, and the communication section 16 are connected to the I/O 12D.

The monitor 30 displays the vehicle that is the candidate for LTA or the vehicle that is the candidate for IMA, and emits a voice for giving alert.

The driver detecting section 32 captures images of the driver by a camera or the like, and acquires captured images of the driver for detecting the sightline direction or the facing direction of the driver. Note that, in a case in which the awake state of the driver is detected as the state of the driver, the driver detecting section 30 may utilize a sensor for detecting an electrocardiogram waveform, or the like.

The driver's vehicle information detecting section 34 detects various types of information such as position information, vehicle speed information, information inputted from a navigation device (road signs or the shape of the road or the like), and the like of the driver's vehicle. The driver's vehicle information detecting section 34 detects the various types of information by a GPS (Global Positioning System) receiver and various types of sensors such as a vehicle speed sensor and the like.

The communication section 16 transmits and receives information of vehicles that are at the periphery of the driver's vehicle and in which the communication sections 16 are installed, and vehicles at the periphery of the driver's vehicle by wireless communication with external servers 36.

Figure 7:
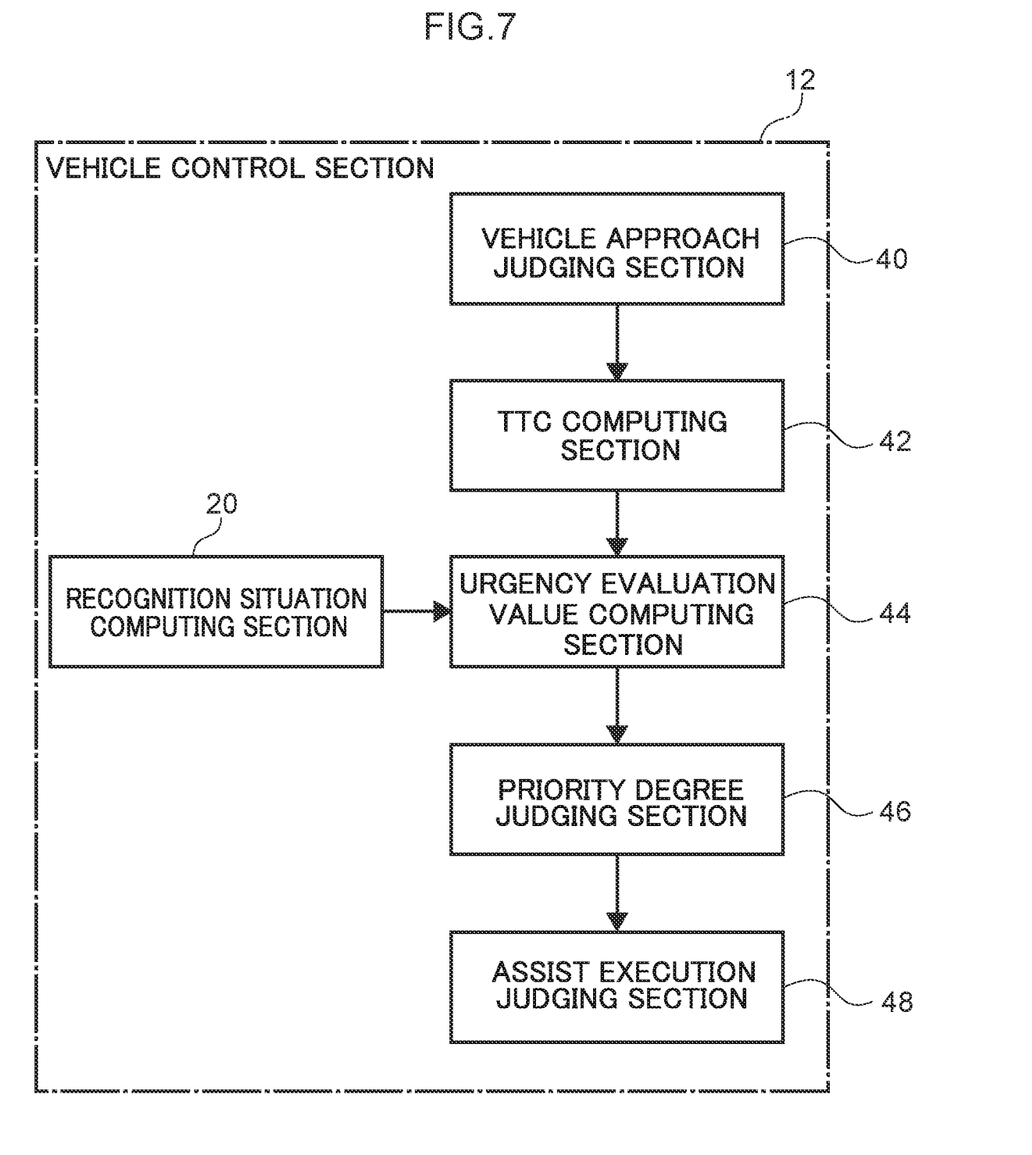
FIG. 7 is a functional block drawing showing concrete functional structures of the vehicle control section.

The concrete functional structures of the vehicle control section 12 are described next. FIG. 7 is a functional block drawing showing the concrete functional structures of the vehicle control section 12. Note that the respective functional structures of FIG. 7 are realized by, for example, programs that are stored in the ROM 12B being executed.

The vehicle control section 12 has the functions of a vehicle approach judging section 40, a TTC computing section 42, the recognition situation computing section 20, an urgency evaluation value computing section 44, a priority degree judging section 46, and an assist execution judging section 48. Note that FIG. 7 illustrates an example in which the above-described sensing section 18 includes the vehicle approach judging section 40 and the TTC computing section 42, and the above-described alert control section 22 includes the functions of the urgency evaluation value computing section 44, the priority degree judging section 46 and the assist execution judging section 48.

From information of vehicles at the periphery of the driver's vehicle that has been received by the communication section 16, the vehicle approach judging section 40 judges whether or not there is a vehicle that is approaching the driver's vehicle. Or, whether or not there is a vehicle that is approaching the driver's vehicle may be judged from the results of detection of cameras or various types of sensors.

In a case in which the vehicle approach judging section 40 judges that there is a vehicle that is approaching the driver's vehicle, the TTC computing section 42 computes the TTC on the basis of the driver's vehicle position information, the position information of the vehicle that is at the periphery of the driver's vehicle, vehicle speed information of the both, and the like.

The recognition situation computing section 20 computes the sightline direction or the facing direction of the driver as the recognition situation of the driver, from the captured images of the driver that are acquired by the driver detecting section 32.

Figure 8:
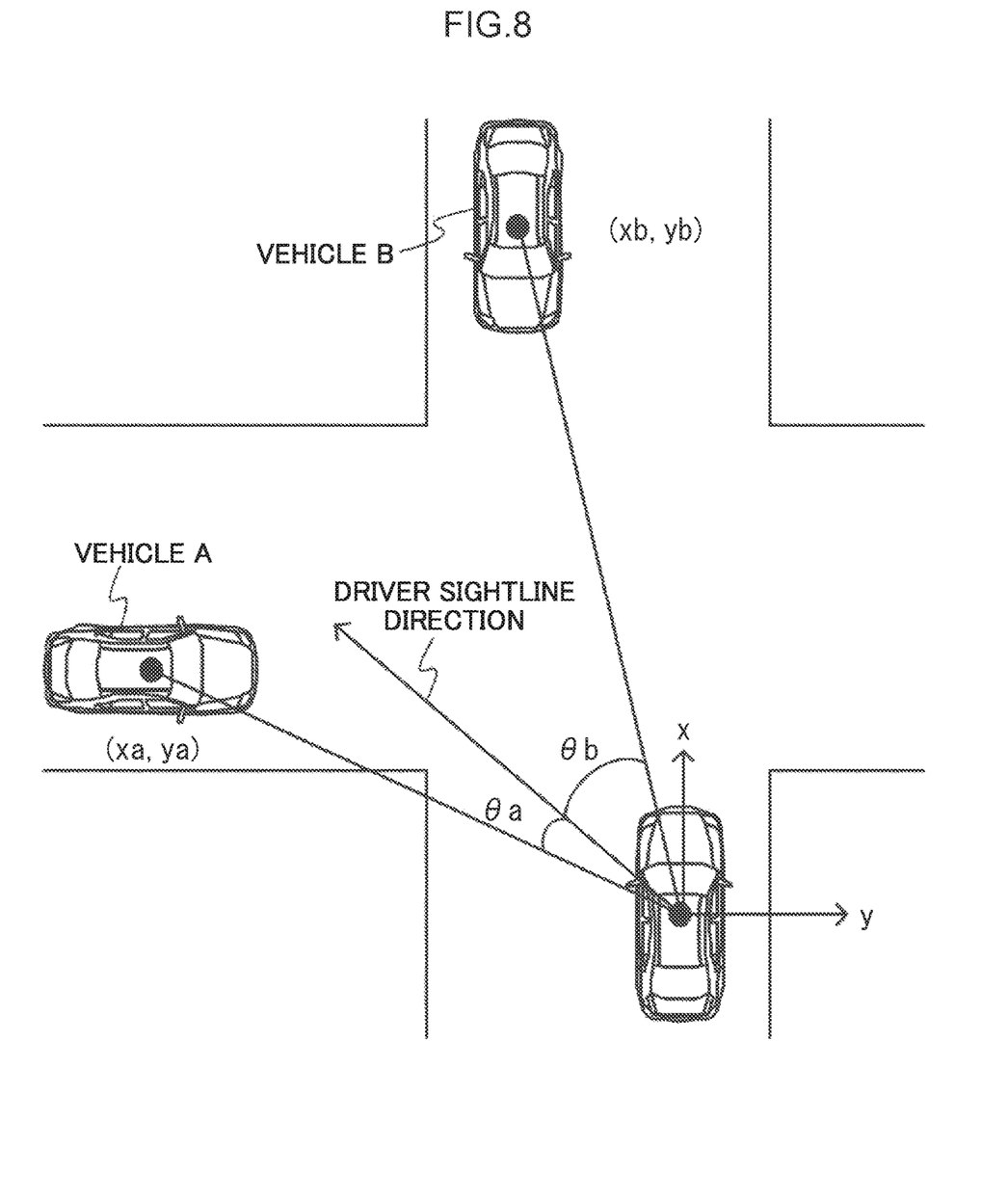
FIG. 8 is a drawing for explaining an example of a method of computing urgency evaluation values in a case in which vehicle A that is the candidate for IMA and vehicle B that is the candidate for LTA exist.

In a case in which there exist plural vehicles that are approaching the driver's vehicle, the urgency evaluation value computing section 44 computes evaluation values for evaluating the urgencies. In a case in which the driver's vehicle detects plural candidates for alerting such as a vehicle that is a candidate for IMA and a vehicle that is a candidate for LTA, or the like, the urgency evaluation value computing section 44 combines the value of the TTC for the object vehicle and the value of the recognition situation of the driver of the driver's vehicle that is computed by the recognition situation computing section 20, and computes an evaluation value of the urgency. For example, a case in which vehicle A that is a candidate for IMA and vehicle B that is a candidate for LTA exist as shown in FIG. 8 is described. The urgency evaluation value computing section 44 uses the sightline direction or the facing direction of the driver of the driver's vehicle as the recognition situation of the driver, and compares the position information of vehicle A and vehicle B, and evaluates the urgency of the object vehicle that exists in the closer direction as being higher. For example, as shown in FIG. 8, by using the driver's vehicle as the central coordinate, angles $\theta a$, $\theta b$ of the both vehicles with respect to the sightline direction of the driver are determined. Then, with urgency evaluation value for vehicle A being VEa and the TTC value for vehicle A being TTCa, the equation $VEa=\theta a/TTCa$ is computed. Further, with urgency evaluation value for vehicle B being VEb and the TTC value for vehicle B being TTCb, the equation $VEb=\theta b/TTCb$ is computed. If VEb>VEa, alert is given while prioritizing vehicle B that is the candidate for LTA, and, if VEb<VEa, alert is given while prioritizing vehicle A that is the candidate for IMA. Further, if VEb=VEa, alert may be given while prioritizing one that has been set in advance, or alert may be given with respect to both.

Note that information of the height direction of the sightline (the elevation angle direction of the sightline or the like) may be sensed in order to recognize the sightline direction of the driver. Further, as described above, the awake state of the driver or the like may be used other than the sightline direction of the driver, as the recognition situation of the driver. In a case of using the awake state, for example, the awake state may be detected by detecting the pulse or an electrocardiogram waveform or the like of the driver, and, instead of above-described θa, θb, coefficients that are determined in advance for awake states may be readied in advance, and the evaluation value may be computed by using the coefficient that corresponds to the awake state.

On the basis of the evaluation values computed by the urgency evaluation value computing section 44, the priority degree judging section 46 determines the vehicle that is the candidate for alerting that is to be prioritized, as described above. In the example of FIG. 8, when VEb>VEa, vehicle B that is the candidate for LTA is prioritized, and, when VEb<VEa, vehicle A that is the candidate for IMA is prioritized.

The assist execution judging section 48 carries out judgment as to the necessity of issuing a display on the monitor 30 or a voice warning, in order to provide alert about the vehicle that is the candidate for alerting that has been specified by the priority degree judging section 46. In this judgment on the necessity, for example, it is judged whether or not a predetermined time at which a warning is to be issued has been reached, and, if the predetermined time has been reached, the monitor 30 is controlled, and image display or voice warning for alerting is carried out. Note that the predetermined time is determined, for example, by judging whether or not the TTC has become less than or equal to a predetermined threshold value.

Figure 9:
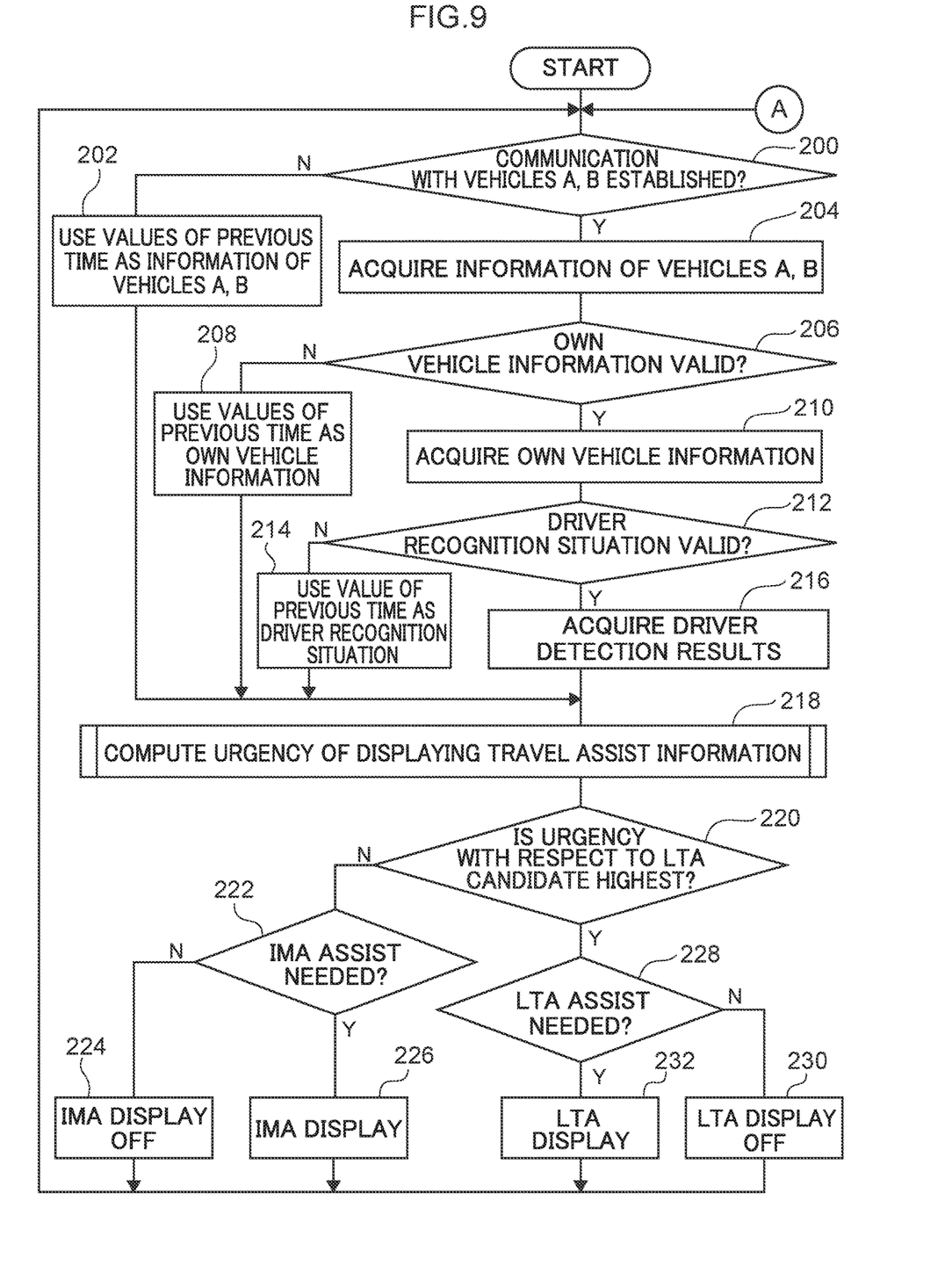
FIG. 9 is a flowchart showing an example of the flow of concrete processings that are carried out at the vehicle control section.

An example of concrete processings that are carried out by the vehicle control section 12 is described next. FIG. 9 is a flowchart showing an example of the flow of concrete processings that are carried out at the vehicle control section 12. Note that the processings of FIG. 9 start in a case in which plural vehicles that are candidates for alerting (targets of alert of LTA and IMA respectively) are sensed by the vehicle approach judging section 40.

In step 200, the CPU 12A judges whether or not communication with vehicle A that is the candidate for IMA and vehicle B that is the candidate for LTA has been established. This judgment is a judgment as to whether or not communication with the vehicles A, B has been established by the communication section 16. If this judgment is negative, the CPU 12A moves on to step 202, and if this judgment is affirmative, the CPU 12A moves on to step 204.

In step 202, the CPU 12A uses the values of the previous time as information of vehicles A, B, and then moves on to step 218.

In step 204, the CPU 12A acquires information of vehicles A, B via the communication section 16, and then moves on to step 206.

In step 206, the CPU 12A judges whether or not the driver's vehicle information is valid. This judgment is, for example, a judgment as to whether or not information can be acquired from the driver's vehicle information detecting section 34. If this judgment is negative, the CPU 12A moves on to step 208, and if this judgment is affirmative, the CPU 12A moves on to step 210.

In step 208, the CPU 12A uses the values of the previous time as the driver's vehicle information, and then moves on to step 218.

In step 210, the CPU 12A acquires the driver's vehicle information that is detected by the driver's vehicle information detecting section 34, and then moves on to step 212.

In step 212, the CPU 12A judges whether or not the driver recognition situation is valid. This judgment is a judgment as to whether or not the driver recognition situation can be acquired from the driver detecting section 32. If this judgment is negative, the CPU 12A moves on to step 214, and if the judgment is affirmative, the CPU 12A moves on to step 216.

In step 214, the CPU 12A uses the value of the previous time as the driver recognition situation, and then moves on to step 218.

In step 216, the CPU 12A acquires the results of detection of the driver detecting section 32, i.e., the captured images of the driver that were acquired by the driver detecting section 32, and then moves on to step 218.

Figure 10:
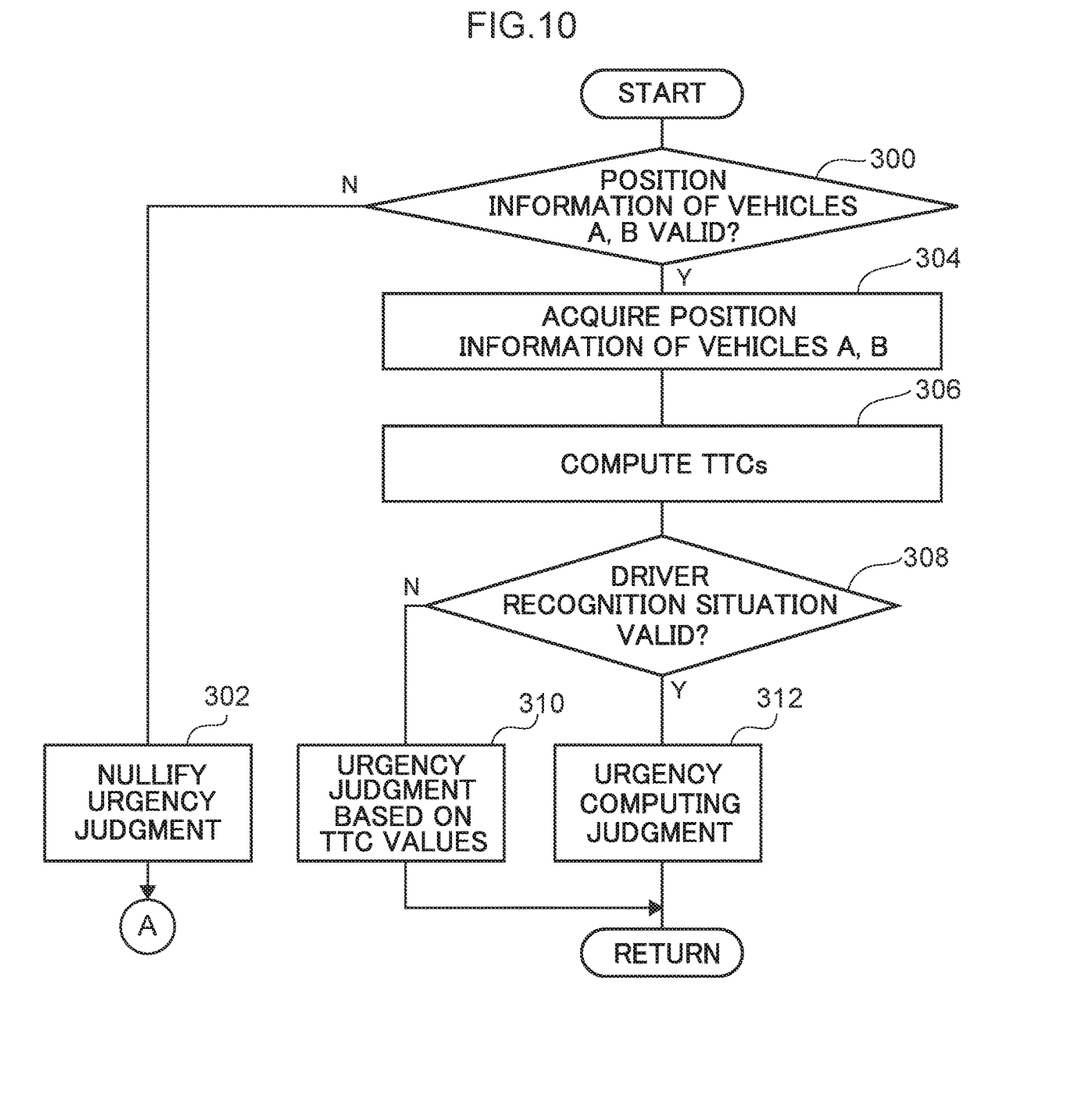
FIG. 10 is a flowchart showing an example of the flow of processing for computing urgency of displaying travel assist information.

In step 218, the CPU 12A carries out processing for computing urgency of displaying travel assist information, and then moves on to step 220. The processings shown in FIG. 10 are carried out in the processing for computing urgency of displaying travel assist information. FIG. 10 is a flowchart showing an example of the flow of the processing for computing urgency of displaying travel assist information. The processing for computing urgency of displaying travel assist information is described here.

In step 300, the CPU 12A judges whether or not the position information of the vehicles A, B are valid. This judgment is, for example, a judgment as to whether or not information of the vehicles A, B can be acquired from the vehicles A, B via the communication section 16. If this judgment is negative, the CPU 12A moves on to step 302, and if the judgment is affirmative, the CPU 12A moves on to step 304.

In step 302, the CPU 12A nullifies the urgency judgment, and returns to step 200 and repeats the above-described processing.

In step 304, the CPU 12A acquires information of the vehicles A, B via the communication section 16, and then moves on to step 306.

In step 306, the CPU 12A computes the TTC for each of vehicles A, B, and then moves on to step 308. Namely, the TTC computing section 42 computes the TTCs on the basis of the driver's vehicle position information, the position information of the vehicles at the periphery of the driver's vehicle, the vehicle speed information of the both, and the like.

In step 308, the CPU 12A judges whether or not the driver recognition situation is valid. This judgment is a judgment as to whether or not the driver recognition situation can be acquired from the driver detecting section 32. If this judgment is negative, the CPU 12A moves on to step 310, and if the judgment is affirmative, the CPU 12A moves on to step 312.

In step 310, the CPU 12A judges the urgencies on the basis of the TTC values, and then returns to the processing for computing urgency of displaying travel assist information, moving on to step 220 of FIG. 9. Namely, the priority degree judging section 46 judges that the vehicle whose TTC is shorter has a highest urgency.

In step 312, the CPU 12A carries out urgency computing judgment, and then returns to the processing for computing urgency of displaying travel assist information, moving on to step 220 of FIG. 9. Namely, the priority degree judging section 46 judges the urgencies on the basis of the evaluation values computed by the urgency evaluation value computing section 44. Due thereto, the urgencies are judged by using the value that expresses the recognition situation of the driver, and therefore, the appropriate alert can be given for the situation of the driver.

On the other hand, in step 220 of FIG. 9, the CPU 12A judges whether or not the urgency with respect to the vehicle that is the candidate for LTA is highest. This judgment is a judgment as to whether or not the results of judgment in above-described step 310 or step 312 were that the urgency with respect to the vehicle that is the candidate for LTA is highest. In a case in which the urgency of the vehicle that is the candidate for IMA is highest and this judgment is negative, the CPU 12A moves on to step 222. In a case in which this judgment is affirmative, the CPU 12A moves on to step 228.

In step 222, the CPU 12A judges whether or not assist is needed with respect to the vehicle that is the candidate for IMA. This judgment is, for example, a judgment by the assist execution judging section 48 as to whether or not the predetermined time at which alert is to be issued has been reached. If this judgment is negative, the CPU 12A moves on to step 224, and if this judgment is affirmative, the CPU 12A moves on to step 226.

In step 224, the CPU 12A controls the monitor 30 so as to turn the IMA display off, i.e., so as to turn off the display that is for giving alert with respect to the vehicle that is the candidate for IMA. The CPU 12A returns to step 200, and repeats the above-described processings.

In step 226, the CPU 12A controls the monitor 30 so as to turn the IMA display on, i.e., so as to turn on the display that is for giving alert with respect to the vehicle that is the candidate for IMA. The CPU 12A returns to step 200, and repeats the above-described processings.

On the other hand, in step 228, the CPU 12A judges whether or not assist is needed with respect to the vehicle that is a candidate for LTA. This judgment is, for example, a judgment by the assist execution judging section 48 as to whether or not the predetermined time at which alert is to be issued has been reached. If this judgment is negative, the CPU 12A moves on to step 230, and if this judgment is affirmative, the CPU 12A moves on to step 232.

In step 230, the CPU 12A controls the monitor 30 so as to turn the LTA display off, i.e., so as to turn off the display that is for giving alert with respect to the vehicle that is the candidate for LTA. The CPU 12A returns to step 200, and repeats the above-described processings.

In step 232, the CPU 12A controls the monitor 30 so as to turn the LTA display on, i.e., so as to turn on the display that is for giving alert with respect to the vehicle that is the candidate for LTA. The CPU 12A returns to step 200, and repeats the above-described processings.

Due to the vehicle control section 12 carrying out processing in this way, an appropriate alert can be given for the situation of the driver, as compared with a case in which alert is issued with a highest priority given to a target of alert whose TTC is shorter.

Note that the above embodiment describes an example in which the evaluation value of the urgency is computed by combining the value of the TTC and the value of the recognition situation of the driver of the driver's vehicle. However, the present disclosure is not limited to this. For example, values that express the recognition situation may be determined in advance in accordance with whether or not a vehicle that is a candidate for alerting is detected from captured images that are captured by cameras that monitor the vehicle periphery, and the evaluation value may be computed by combining this value with the value of the TTC.

Further, as an example, the above embodiment describes an example in which the two driving assist functions that are IMA and LTA are provided, but the present disclosure is not limited to two types.

Further, the above embodiment describes an example in which a vehicle that is a target of alert is sensed due to communication being carried out by the communication section 16. However, the present disclosure is not limited to this, and may be applied to a form in which a candidate for alerting is sensed by utilizing various types of sensors or cameras or the like, and not by carrying out communication.

Further, the above describes a case in which the processings that are carried by the vehicle control section 12 in the above-described embodiment are software processings that are carried out by the execution of programs. However, the present disclosure is not limited to this, and the processings carried out by the vehicle control section 12 may be, for example, processings that are carried out by hardware. Or, the processings carried out by the vehicle control section 12 may be processings combining both software and hardware. Further, in the case of processings by software, the programs may be stored on any of various types of non-transitory storage media such as a DVD (Digital Versatile Disc) or the like and distributed, and executed at a processor such as the CPU 12A or the like.

Moreover, the present disclosure is not limited to the above, and, other than the above, can of course be implemented by being modified in various ways within a scope that does not depart from the gist thereof.

What is claimed is:

1. A vehicle control device comprising:
a memory; and
a processor,
wherein the processor is configured to:
sense a candidate of alert;
in a case in which a plurality of candidates of alert are sensed, determine a recognition situation with respect to the plurality of candidates of alert based on a detected state of a driver, wherein a sightline direction or a facing direction of the driver serves as the detected state of the driver;
determine a time to collision for each of the plurality of candidates of alert;
determine an evaluation value for each of the plurality of candidates of alert, wherein the evaluation value for each of the plurality of candidates of alert is based on (i) an angle of the sightline direction or the facing direction of the driver, using the driver's vehicle as a central coordinate, with respect to a central coordinate of each of the plurality of candidates of alert, and (ii) the time to collision with respect to each of the plurality of candidates of alert,
prioritize a candidate, from among the plurality of candidates of alert that has an evaluation value larger than the other evaluation values as a target of alert, and
carry out alert control with respect to the target of alert that has been prioritized.

2. The vehicle control device of claim 1, wherein the processor is configured to acquire information relating to the plurality of candidates of alert by wireless communication, and sense the plurality of candidates of alert by using the acquired information.

3. A vehicle control method comprising, by a processor:
sensing a candidate of alert;
in a case in which a plurality of candidates of alert are sensed, determining a recognition situation with respect to the plurality of candidates of alert based on a detected state of a driver, wherein a sightline direction or a facing direction of the driver serves as the detected state of the driver;

determining a time to collision for each of the plurality of candidates of alert;

determining an evaluation value for each of the plurality of candidates of alert, wherein the evaluation value for each of the plurality of candidates of alert is based on (i) an angle of the sightline direction or the facing direction of the driver, using the driver's vehicle as a central coordinate, with respect to a central coordinate of each of the plurality of candidates of alert, and (ii) the time to collision with respect to each of the plurality of candidates of alert;

prioritizing a candidate, from among the plurality of candidates of alert that has an evaluation value larger than the other evaluation values as a target of alert; and carrying out alert control with respect to the target of alert that has been prioritized.

4. The vehicle control method of claim 3, wherein the processor acquires information relating to the plurality of candidates of alert by wireless communication, and senses the plurality of candidates of alert by using the acquired information.

5. A non-transitory storage medium that stores a program for causing a processor to execute vehicle control processing comprising:

sensing a candidate of alert;

in a case in which a plurality of candidates of alert are sensed, determining a recognition situation with respect to the plurality of candidates of alert based on a detected state of a driver, wherein a sightline direction or a facing direction of the driver serves as the detected state of the driver;

determining a time to collision for each of the plurality of candidates of alert;

determining an evaluation value for each of the plurality of candidates of alert, wherein the evaluation value for each of the plurality of candidates of alert is based on (i) an angle of the sightline direction or the facing direction of the driver, using the driver's vehicle as a central coordinate, with respect to a central coordinate of each of the plurality of candidates of alert, and (ii) the time to collision with respect to each of the plurality of candidates of alert;

prioritizing a candidate, from among the plurality of candidates of alert that has an evaluation value larger than the other evaluation values as a target of alert; and carrying out alert control with respect to the target of alert that has been prioritized.

6. The non-transitory storage medium of claim 5, wherein information relating to the plurality of candidates of alert is acquired by wireless communication, and the plurality of candidates of alert are sensed by using the acquired information.

* * * * *